Oct. 7, 1969
R. A. MILLER
3,471,681
MOBILE ELECTRIC HEATING IMPLEMENT FOR APPLYING
HEAT TO A HORIZONTAL SURFACE
Filed April 29, 1966
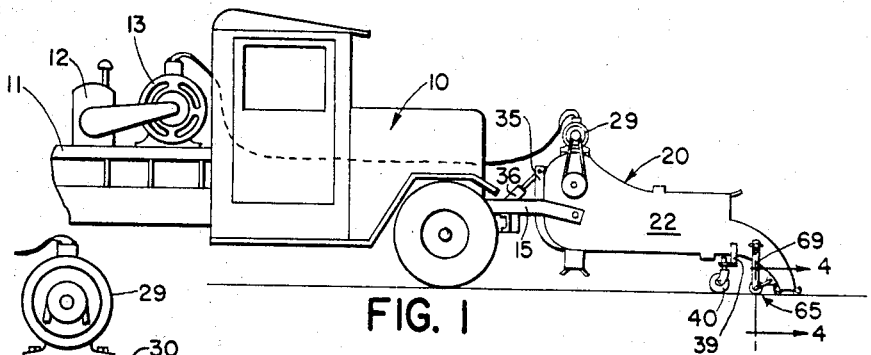
FIG. 1
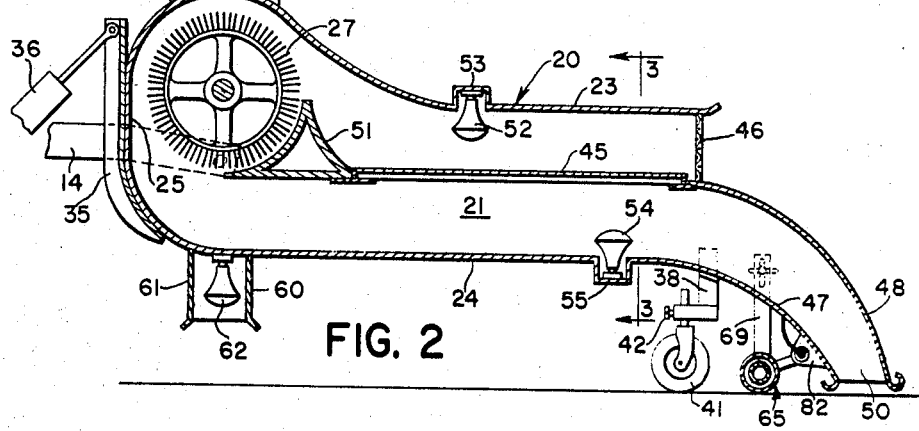
FIG. 2
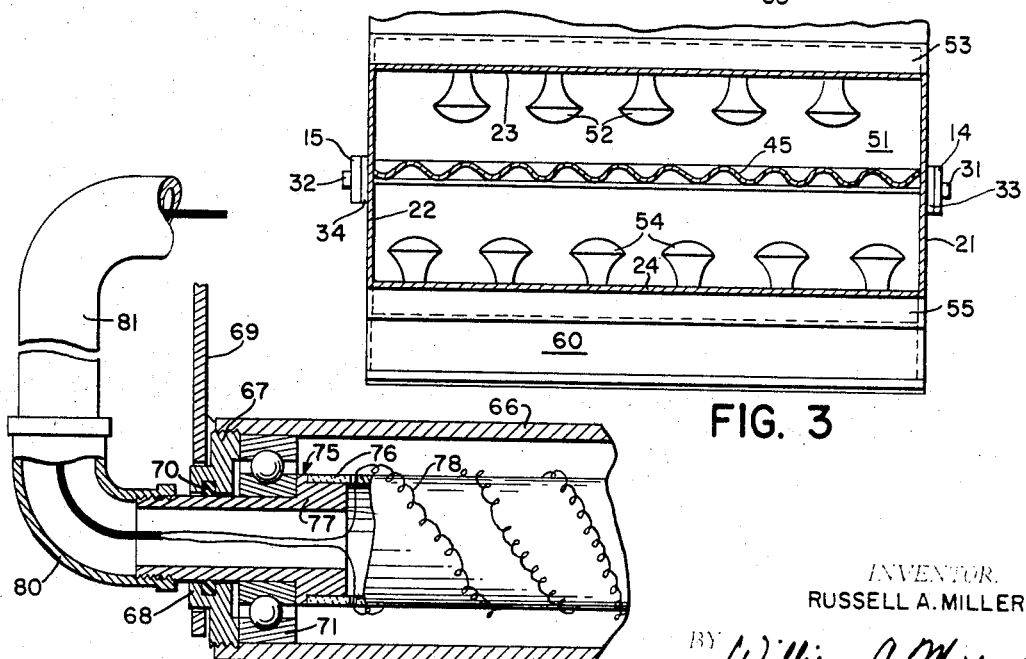
FIG. 3
FIG. 4
INVENTOR.
RUSSELL A. MILLER
BY William A. Murray
ATTORNEY United States Patent Office 3,471,681
Patented Oct. 7, 1969

3,471,681
MOBILE ELECTRIC HEATING IMPLEMENT FOR APPLYING HEAT TO A HORIZONTAL SURFACE
Russell Arthur Miller, 123 Wynnwood Drive, Peoria, Ill. 61614
Filed Apr. 29, 1966, Ser. No. 546,354
Int. Cl. H05b 1/00, 3/02, 11/00
U.S. Cl. 219—368                10 Claims

ABSTRACT OF THE DISCLOSURE

A mobile surface treating implement for removing snow and/or drying a surface comprises a main housing structure having a rearwardly disposed blower and an upper horizontal air inlet duct leading to the blower and a lower horizontal air discharge duct extending forwardly from the blower and terminating in a downwardly directed discharge outlet. Positioned within the upper and lower ducts are banks of electric heating elements. Air heated by the elements is discharged from the outlet directly onto the surface to be heated. An electrically heated roller is mounted directly behind the air outlet and is designed to engage the surface to be heated to further heat the same. A bank of heating lamps positioned rearwardly of the outlet and roller is provided to heat the surface by radiation. The implement is designed to be mounted on the forward end of a mobile vehicle.

---

This invention relates to an implement adapted to sweep over a horizontal surface and direct heat onto the surface. More particularly this invention relates to an implement adapted to draw in and heat cool air and to direct the resulting warm air onto the surface.

It is difficult if not impossible to completely remove snow from a surface by a common snow plow. In slightly depressed areas of the surface the snow cannot be reached by the blade of the plow. Also in iced and packed surfaces, the blade will often times merely pass over the surface.

It is therefore the object of the present invention to provide a surface treating implement that may be used in some instances to melt snow falling on the surface and in some instances to follow up a snow plow and remove the ice and snow remaining on the surface after a snow plow has passed over the surface. Specifically it is the object of the invention to provide an implement that applies heat to the surface by blowing warm air on the surface or/and applying warm elements to the surface.

More specifically the object of the invention is to provide a surface treating implement that is supported on the forward end of a mobile vehicle and is composed of a main housing structure having a rearwardly positioned blower and an upper horizontal air inlet duct leading to the blower and a lower horizontal discharge duct extending forwardly from the blower and terminating in an air discharge outlet directed downwardly and disposed closely to the ground surface. Positioned within the upper and lower ducts are transverse banks of heating elements in the form of lamps with the upper heating elements directed downwardly and the lower heating elements directed upwardly to warm a transverse horizontal wall that is between and is common to both ducts. Air passing through the upper and lower ducts is heated by the heating elements and passes out the outlet directly onto the ground or horizontal surface.

As a further object of the invention it is proposed to support on the above described housing a heated roller directly behind the air outlet that will engage the surface and further melt the snow or dry the surface as desired.

It is still a further object of the invention to provide a bank of lights behind the air outlet that is played directly onto the surface to be dried or treated.

It is also to be understood that while one of the more important uses of the above implement is for snow removal, further uses may be for drying surfaces such, for example, as baseball diamonds, tracks for racing, tennis courts and other outdoor arenas.

Other objects and advantages of the invention will become apparent to those skilled in the art as the nature of the invention is better understood from the following description and as shown in the accompanying drawings.

FIG. 1 is a side view of a portion of a mobile vehicle with a surface treating unit extending forwardly therefrom and including a source of power generation.

FIG. 2 is an enlarged vertical sectional view taken along the fore and aft centerline of the surface treating unit.

FIG. 3 is a sectional view taken substantially along the line 3—3 of FIG. 2.

FIG. 4 is an enlarged sectional view taken substantially along the line 4—4 of FIG. 1.

Referring now to the drawings, a vehicle or truck 10 has a flat bed 11 that carries a stationary engine 12 having a drive to an electrical generator 13. Extending forwardly and connected to the main frame of the truck 10 is a frame extension composed of a pair of fore and aft transversely spaced structural beams 14, 15.

Supported on the beams 14, 15 forwardly of the truck 10 is a surface treating unit composed of a housing structure 20 having left- and right-hand upright side walls 21, 22 interconnected at their upper edges by an overhead wall 23 and at their lower edges by an under panel 24. The overhead panel 23 sweeps upwardly at its rear portion and then arcuately downwardly to join a rear upright wall portion 25 which in turn joins the rear of the under panel 24. As may best be seen in FIG. 2, the walls 21, 22, 23, 24, 25 of the housing structure 20 form a blower housing at the rear of the structure. In the rear portion of the housing structure 20 is a blower fan 27 supported on a transverse horizontal drive shaft 28 having opposite ends journaled in the respective side walls 21, 22. An electric motor 29 is carried on a motor base 30 welded to the top of the housing structure 20 and is drivingly connected to the shaft 28 by a belt drive.

The housing structure 20 is supported on beams 14, 15 by means of pivot studs 31, 32 that project from plates 33, 34 welded to the side walls 21, 22. The studs 31, 32 extend through the beams 14, 15 and serve as pivotal connections to the beams 14, 15 so that the housing structure may be adjusted vertically. A U-shaped bracket 35 is welded to the rear wall 25. A hydraulic cylinder 36 extends between the truck frame and bracket 35 and may be adjusted to raise and lower the housing structure 20.

A pair of L-shaped brackets 38, 39 extend downwardly from opposite sides of the housing structure 22 and support a pair of forwardly positioned caster wheels 40, 41 that supports the forward end of the housing structure 20. Set screws, such as at 42, serve to lock the wheels at a desired position in relation to the housing structure 20.

A corrugated horizontal panel 45 is postioned substantially midway between the upper overhead panel 23 and the under panel 24. The mid panel 45 extends between and is connected to side walls 22, 23 and divides the housing structure into an upper air intake duct leading to the rear blower portion of the housing structure 20 and a lower air discharge duct leading forwardly from the blower portion. A grille 46 is positioned in the air inlet between the forward edges of the panels 23, 45. The under panel 24 has an arcuate shaped and downwardly inclined forward portion 47. A forward arcuate extension 48 of the panel 45 is above the panel 47 and defines with forward extensions of the sidewalls 21, 22 a downwardly inclined hood with a downwardly opening outlet 50 closely adjacent the ground surface. A triangular shaped styling 51 extends across the housing structure at the rear edge of the mid panel 45 and operates to guide air into the upper side of the blower rotor 27 and out of and away from the underside of the rotor.

Disposed within the upper air conduit is a transverse bank of heating elements or lamps 52 that directs its rays to the top surface of the mid panel 45. A transverse recess 53 is provided in the upper panel to support the lamps 52 and the electrical connections required to light the lamps. A similar bank of lamps 54 is provided in a recessed portion 55 of the under panel 24 and is disposed in a forward offset relation to the upper bank of lamps 52. Consequently the lamps 52, 54 will heat the central panel 45 and the upper and lower air conduits. Being corrugated, the central panel 45 provides a large heated surface or area. Air moving in the upper conduit will be warmed by the heat of the panel 45 and by passing over and around the lamps 52. As the air leaves the blower 27 in a semi-warm state, it will be further heated in the lower conduit by passing adjacent the warm panel 45 and over and around the lamps 54.

Transverse upright and fore and aft spaced reflecting panels 60, 61 depend from the rear underside of the under panel 24 and open downwardly. A third bank of lamps 62 is retained on the housing structure 20 between the panels 60, 61 and is directed on the surface to be treated.

Disposed directly behind the air outlet 50 is a roller structure 65 composed of an outside cylinder wall 66 having internally threaded ends receiving caps 67. The caps 67 have outwardly projecting boss portions 68 that receive lower ends of metal straps 69 that depend from the respective side walls 21, 22. A sealing ring 70 is provided internally of the cap 67. A bearing 71 is positioned at the end of and internally of the cylinder 66 and against the cap 67. A central core structure 75 is disposed internally of and extends the length of the cylinder 66. The structure 75 is composed of a cylindrical ceramic core 76 that is fitted on internal end pipes 77 that extend through and project outwardly of the caps 67. The pipes 77 are journaled in the bearings 71 and are sealed by the rings 70. Electrical heating coils 78 are coiled around the insulator core 76 and serve to heat the outer cylinder 66. The brackets 69 are adjustable vertically and consequently may raise or lower the entire structure 65 to the desired height.

An elbow fitting 80 is connected to each of the outer ends of the pipes 77 and the lower ends of an L-shaped pipe 81 that projects upwardly and forwardly and is pivotally carried on a depending bracket 82 on the underwall extension 47. Suitable wiring extends through the pipe members 80, 81 and 77 and is connected to the coils 78. It should here be understood that while not shown, suitable wiring is provided to operate the banks of lamps and all other electrical units on the implement, and all units receive their power from the generator 13 on the truck bed 11. The wiring, its insulation and its protective shielding may be of any conventional types and consequently are not shown in detail.

In operation it is anticipated the implement will move over a surface at a relatively slow rate. In melting snow the implement will follow up a conventional snow plow so as to clear the surface of the last remaining pockets of snow or ice, or it will be utilized in periods when the snow is falling and before it becomes extremely deep. An ideal location for use would be for runways at airports. Through suitable electrical switches, the heating banks 52, 54, and 62 may be used as desired. The heated roller structure may be raised out of contact with the ground surface merely by adjusting the brackets 69.

When it is desired to dry surfaces such as baseball diamonds, racetracks, tennis courts and the like, such may be done at a relatively slow rate since the areas are not large. Obviously the unit may be of a size comparable to its use, and for example on a baseball field, there would probably be a small truck, a relatively small generator, and comparatively narrow banks of heating elements.

While only the preferred design of the invention has been shown and described, it is recognized that other forms and variations may occur to those skilled in the art. Therefore, it should be understood that the present detailed description has been given for the purpose of concisely and completely illustrating the principles of the invention, and there is no intention to limit or narrow the invention beyond the broad concepts as herein claimed.

What is claimed is:

1. An implement for applying heat to a horizontal surface comprising: a main mobile vehicle adapted to travel over the ground; a housing structure supported on the vehicle including a blower housing portion, an air intake duct extending fore and aft from the blower housing portion to an intake at its forward end, an air discharge duct beneath the intake duct and extending forwardly from the blower housing portion and terminating in an air discharge outlet directed downwardly and closely adjacent the surface; a blower within the blower housing portion; and heating elements supported by the housing structure within the intake duct and discharge duct whereby air moving through the ducts will pass through the effective heating area of the elements prior to entry and after leaving the blower.

2. The structure as set forth in claim 1 further characterized by a transverse roller supported on the housing in trailing relation to the outlet; a heating element within the roller; and means on the housing for adjusting the height of the roller in respect to the surface to be heated.

3. The structure as set forth in claim 1 further characterized by a transverse bank of heating elements supported on the housing and depending from its underside; and fore and aft spaced upright wall elements forwardly and rearwardly of the bank of heating elements terminating at lower edges closely adjacent the ground level whereby the surface of the ground will be exposed to the rays of the elements.

4. The structure as set forth in claim 1 in which the housing structure is supported on the vehicle in forward relation thereto and the forward end thereof is supported on ground borne wheel means.

5. The structure as set forth in claim 1 further characterized by the intake duct and discharge duct being in a vertical stacked relation to one another and having a common wall therebetween; and the heating elements are transverse banks of heating lamps supported above and below respectively the common wall and directed toward the common wall.

6. The structure as set forth in claim 5 in which the banks of heating lamps in the intake duct and discharge duct are offset fore and aft from one another so that different portions of the common wall receive the effects of the lamps.

7. The structure as set forth in claim 2 in which the roller is supported for rotation at opposite ends on structure depending from the housing structure and each end of the roller has an internal journal; a central core within the roller having end sections extending through the journals whereby the roller may rotate in respect to the core; and means extending through the end sections and carried by the core for heating the roller.

8. The structure as set forth in claim 1 in which the heating elements are transverse banks of lamps extending across the air inlet duct and air discharge duct, the housing structure is elongated and disposed in a fore and aft direction with the blower at its rear end, the air inlet duct is horizontally disposed and extends rearwardly from a forwardly located air inlet to the blower, and the air discharge duct is horizontally disposed beneath the air inlet duct and extends from the air outlet at its forward end to the blower.

9. The structure as set forth in claim 8 further characterized by the housing structure being pivotally supported at its rear end for vertical movement on the vehicle, and power means between the vehicle and housing structure adapted to raise and lower the forward end of the housing structure about the pivotal connection whereby the air outlet may be raised and lowered.

10. An implement for applying heat to the surface of the ground and ground supported surfaces comprising: a main mobile vehicle; a fore and aft extending housing structure including upper and lower horizontally disposed and for and aft extending air ducts; a blower in one end of the housing structure in communication with and for drawing air through the upper duct and for blowing air through the lower duct; an air inlet at the forward end of the housing structure opening into the upper duct; an air discharge structure at the forward end of the housing in communication with the lower duct and having an air outlet directed downwardly and opening onto the surface to be treated; and heating elements retained within the housing structure adapted to heat the air moving through the housing structure; and means mounting the housing structure forwardly of and on the vehicle.

References Cited

UNITED STATES PATENTS

| | | | |
|---|---|---|---|
| 1,368,328 | 2/1921 | Eaton | 219—376 X |
| 1,698,196 | 1/1929 | Lang | 126—271.1 |
| 2,607,877 | 8/1952 | Stevens | 219—302 |
| 2,820,450 | 1/1958 | Zimmerman | 126—271.2 |
| 3,108,586 | 10/1963 | Wilson | 126—271.2 |
| 3,174,477 | 3/1965 | Wilson | 126—271.2 |
| 3,308,268 | 3/1967 | Laing | 219—370 |

ANTHONY BARTIS, Primary Examiner

U.S. Cl. X.R.

126—271.2; 219—202, 369, 376, 377, 469